Dec. 30, 1941. J. V. SCHAFER 2,268,463
FISHING REEL
Filed Aug. 21, 1939 2 Sheets-Sheet 1

Inventor:
John V. Schafer
By: Freeman, Sweet, Albrecht & Wiedman
Attys.

Dec. 30, 1941.  J. V. SCHAFER  2,268,463
FISHING REEL
Filed Aug. 21, 1939  2 Sheets-Sheet 2

Inventor:
John V. Schafer
By Freeman, Sweet,
Albrecht & Werdman
Attys.

Patented Dec. 30, 1941

2,268,463

UNITED STATES PATENT OFFICE 2,268,463

FISHING REEL

John V. Schafer, Bronson, Mich., assignor to Bronson Reel Company, Bronson, Mich., a corporation of Michigan Application August 21, 1939, Serial No. 291,165

4 Claims. (Cl. 242—84.5)

My invention relates to fishing reels, and includes among its objects and advantages an improvement in the type of fishing reel commonly referred to as a free spool salt water fishing reel, with particular reference to avoiding blacklash or snarling of the line of the spool.

In the accompanying drawings:

Figure 2 is an inside view of the head housing with the braking means set for application with medium force but held in inoperative position because the clutch is in;

Figure 1:
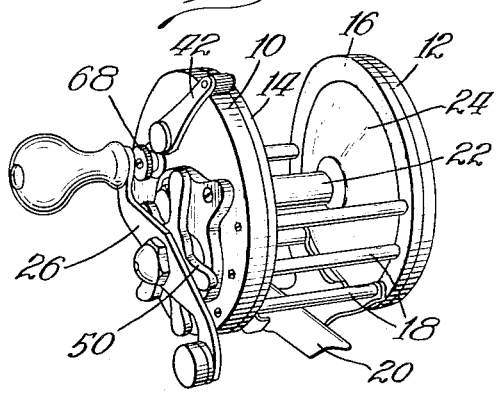
Figure 1 is a perspective of a complete reel.

In the embodiment of the invention selected for illustration, I have illustrated the application of the invention to a common type of reel comprising a head plate 10 and a tail plate 12 of Bakelite or similar material faced with metal facing rings 14 and 16 respectively, and braced into a unitary rigid frame by pillars 18 and by the plate 20 which also forms the usual rod clip for mounting the reel on a rod. I have indicated line-holding means in the nature of a spool made up of a shaft 22 and end bells 24. The spool is driven by a crank 26 through any suitable transmission common to the prior art. The co-pending patent application of Joseph A. Coxe, Serial Number 91,288, filed July 18, 1936, now Patent 2,182,468, issued December 5, 1939, indicates one of several types of driving connection with which the invention may be used. Briefly, the spool driving means is mounted below the chassis plate 28, and includes the usual drive gear 30 coaxial with the crank 26. The gear 30 drives the pinion 32 which is integral with the male clutch member 34 and axially slidable on the reduced end portion 36 of the spool shaft 22. The means for moving the clutch member 34 into and out of operative position includes the slidable plate 38 pressed toward the position of Figure 2 by the coil springs 40, and the manual control crank 42 pivoted at 44 and carrying the pin 46 entering the slot 48 in the plate 38 for pushing the plate 38 over to the position shown in Figures 3 and 4 against the force of the springs 40.

The braking instrumentalities used in salt water reels fall naturally into two classes which are referred to herein as heavy braking means and light braking means. The heavy braking means are adapted to absorb enough power to control, in a measure, the outward run of a large fish. Such braking means are usually controlled by means of the star wheel 50 of Figure 1, and per se form no part of the present invention. The light braking means is intended to prevent the spool from spinning too freely when there is no fish on the line and the bait is being thrown out or trolled or otherwise manipulated preparatory to attempting to catch a fish. During such manipulations, if the spool is entirely free, a chance movement may set it spinning so that the mass of line on it is loosened and snarled, producing knots and tangles in the line commonly referred to by fishermen as backlash.

According to the invention, I provide a light braking means illustrated as a non-metallic brake shoe 52 carried by a metal supporting arm 54 pivoted at 56 on the chassis plate 28. The spring 58 is provided for resiliently urging the brake shoe into the operative relationship of Figure 3, being pivoted to the arm 54 at 60, and at its other end to a pin 62 on the rotary cam 64, integrally mounted on the inner end of a shaft 66 journaled in the head 10 and adapted to be set in any desired position by the externally accessible knurled head 68. In addition to the pin 62, the cam plate 64 is provided with a shoulder 70 and a combined shoulder and stop arm 72. The shoulder and stop arm are adapted to contact the fixed pin 74 carried by the chassis plate 28 to limit the rotation of the cam plate 64 in both directions.

Figure 2:
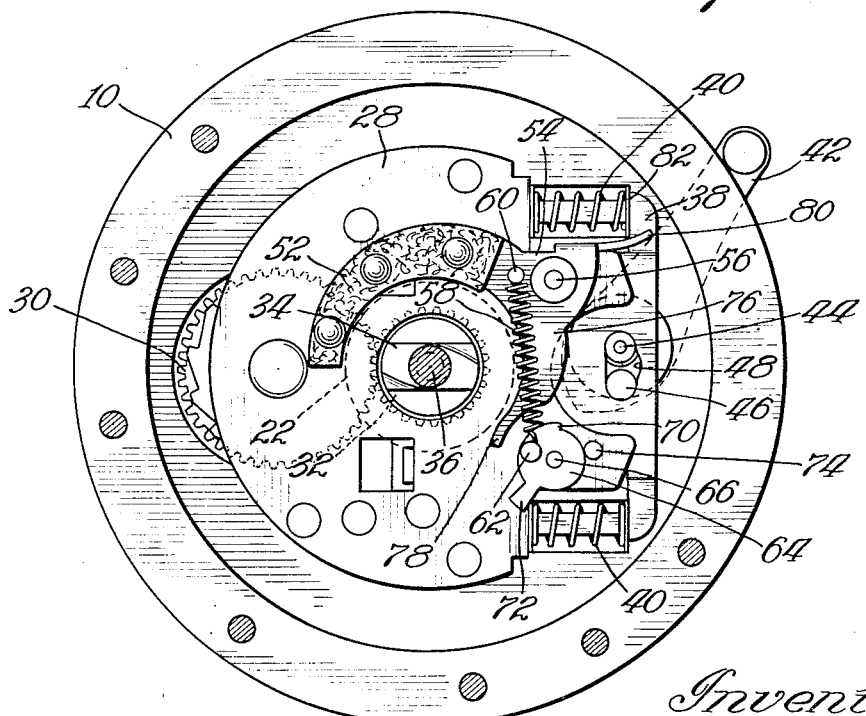
Figure 3:
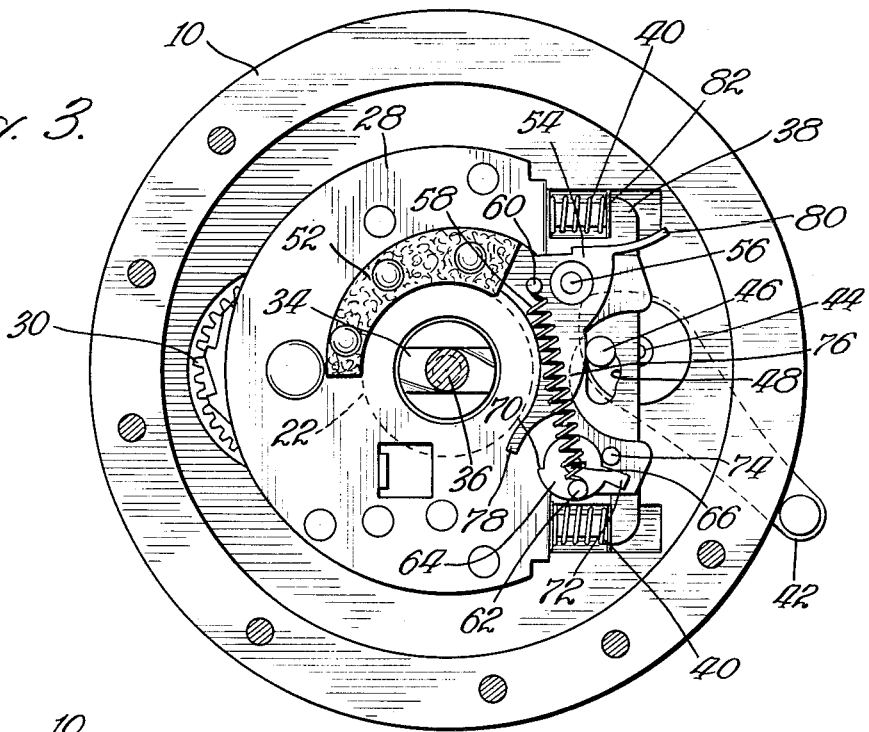
Figure 3 is a similar view of the same parts with the braking means set for substantially maximum friction and in operative position.
Figure 4:
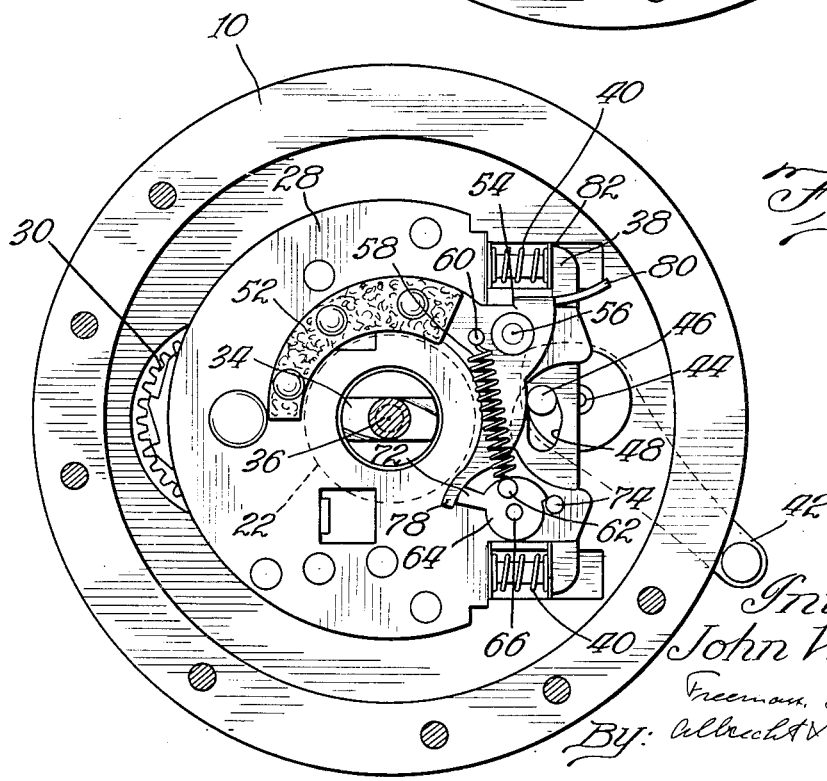
Figure 4 is a similar view of the same parts with the braking means adjusted to be inoperative, independent of the condition of the clutch.

It will be apparent that rotation of the cam plate 64 from the position of Figure 4, where the length and tension of the spring 58 is at a minimum, to the position of Figure 2, will increase the tension of the spring 58 and the force with which the shoe 52 will rub on the spool shaft 22, indicated in dotted lines in Figures 2, 3, and 4, in correct position with respect to the brake shoe. Similarly, movement to the position of Figure 3 will develop maximum tension in the spring and maximum braking application of the shoe 52.

Two independent means are provided for rendering the brake shoe 52 inoperative. The first means includes a lever arm 76 integral with the brake arm 54 and ending in an arcuate tip 78. In the position of Figure 4 the arm 72 on the cam 64 abuts the tip 78 and as long as the arm 72 is in that position the brake will never operate. The side edge of the arm 72 lies at such an angle that in moving into the position of Figure 4 it will strike the end of the tip 78 and deflect it into the position of Figure 4. However, whenever the cam 64 is in the position of Figure 2 or the position of Figure 3, the brake will be applied with varying degrees of force, so far as the action of the cam 64 and spring 58 is concerned.

The other means for rendering the brake inoperative includes the heel 80 also rigidly united with the arm 54 to rotate with the arm around the pivot 56. This heel lies at an acute angle intersecting the path of the upper spring abutment 82 on the clutch-shifting plate 38. It will be apparent that in the position of Figure 3, when the clutch-shifting plate has been pushed to the left and the clutch is disconnected, there is no contact between the heel 80 and the abutment 82. But when the angler throws the control lever 42 over into the position of Figure 2 for the purpose of reeling in the line with or without a fish in play, the abutment 82 slides along the inclined face of the heel 80 and cams the brake 52 away from the shaft 22 into the inoperative position of Figure 2. Thus the brake 52 can never operate where it would impose an additional load on the operator in reeling in a fish or a bait, but whenever the operator disconnects the clutch, the freedom of the spool is gently checked to the extent determined by the pre-selected adjustment of the cam plate 64.

Without further elaboration the foregoing will so fully explain my invention that others may, by applying a knowledge current at the time of application, readily adapt the same for use under various conditions of service.

I claim:

1. In a free spool fishing reel: a frame; a rotatable line holder journaled in said frame including a spool and a shaft; a rotatable crank; a transmission from said crank to said holder including gearing and a clutch; manual clutch control means for connecting and disconnecting said crank and holder; said control means including a movable element housed in said frame; a light brake movably mounted in said frame and adapted to rub on and retard the movement of said holder; resilient means tending to cause application of said brake; manual brake control means for adjusting the tension of said resilient means or for positively holding said brake in inoperative position; and an independent connection between said clutch control means and said brake for holding said brake in inoperative position when said crank and holder are operatively connected by said clutch.

2. In a free spool fishing reel: a frame; a rotatable line holder journaled in said frame including a spool and a shaft; a rotatable crank; a transmission from said crank to said holder including a clutch; manual clutch control means for connecting and disconnecting said crank and holder; said control means including a movable element; a light brake movably mounted in said frame and adapted to rub on and retard the movement of said holder; resilient means tending to cause application of said brake; manual brake control means for adjusting the tension of said resilient means or for positively holding said brake in inoperative position; and an independent connection between said clutch control means and said brake for holding said brake in inoperative position when said crank and holder are operatively connected by said clutch.

3. In a free spool fishing reel, in combination: a frame including head and tail end plates, pillars interconnecting said plates, and a rod clip integrally assembled with said plates and pillars; a spool journaled in said frame; a stationary chassis plate associated with said head end plate; a rotatable crank; a transmission from said crank to said spool including adjustable friction brake means coaxial with said crank, an externally accessible star wheel for adjusting said friction brake means, and clutch means coaxial with said spool; a slidable clutch-shifting plate, slidable on said chassis plate; externally accessible means for manually actuating said clutch-shifting plate; a bell crank lever pivoted on said chassis plate; a brake shoe on one arm of said bell crank lever adapted to move into and out of engagement with said spool; a combined cam and crank means adjacent the other arm of said bell crank lever; said cam means being adapted in one position to engage said lever arm and hold said brake positively in inoperative position; a tension spring connecting said crank means to the brake arm of said bell crank lever and tending to apply said brake; and externally accessible means for manual adjustment of said cam and crank means.

4. In a free spool fishing reel, in combination: a frame including head and tail end plates; a spool journaled in said frame; a stationary chassis plate associated with said head end plate; a rotatable crank; a transmission from said crank to said spool including clutch means; a slidable clutch-shifting plate, slidable on said chassis plate; externally accessible means for manually actuating said clutch-shifting plate; a ball crank lever pivoted on said chassis plate; a brake shoe on one arm of said bell crank lever adapted to move into and out of engagement with said spool; a combined cam and crank means adjacent the other arm of said bell crank lever; said cam means being adapted in one position to engage said lever arm and hold said brake positively in inoperative position; a tension spring connecting said crank means to said lever and tending to apply said brake; and externally accessible manual means for manual adjustment of said cam and crank means.

JOHN V. SCHAFER.